United States Patent [19]
Kurtti

[11] Patent Number: 4,549,770
[45] Date of Patent: Oct. 29, 1985

[54] BELT CLAMPING GUIDE LOOP

[75] Inventor: Gary R. Kurtti, East Detroit, Mich.

[73] Assignee: General Motors Corporation, Detroit, Mich.

[21] Appl. No.: 637,871

[22] Filed: Aug. 6, 1984

[51] Int. Cl.[4] ............................................. A62B 35/02
[52] U.S. Cl. ................................. 297/479; 24/136 K; 24/170; 280/801; 297/483
[58] Field of Search ............... 297/483, 479; 280/801, 280/808; 24/136 K, 170

[56] References Cited

U.S. PATENT DOCUMENTS

| | | | |
|---|---|---|---|
| 3,847,434 | 11/1974 | Weman | 297/483 |
| 3,886,374 | 5/1975 | Lefeuvre | 180/82 C |
| 3,898,715 | 8/1975 | Balder | 24/196 |
| 3,911,535 | 10/1975 | Mauron | 24/170 |
| 3,924,875 | 12/1975 | Lefeuvre | 280/808 |
| 4,009,510 | 3/1977 | Lindblad | 24/196 |
| 4,208,770 | 6/1980 | Takada | 24/136 K |
| 4,310,175 | 1/1982 | Pickett | 280/801 |
| 4,310,176 | 1/1982 | Furusawa et al. | 280/801 |
| 4,341,359 | 7/1982 | Jahn | 242/107 |
| 4,371,127 | 2/1983 | Shimogawa | 242/107.2 |
| 4,438,551 | 3/1984 | Imai | 297/479 |

Primary Examiner—James T. McCall
Attorney, Agent, or Firm—Charles E. Leahy

[57] ABSTRACT

A restraint belt guide loop assembly for deflecting a belt from a retractor to a diagonal position across the occupant upper torso includes a mounting bracket pivotally mounted on the vehicle body and first and second belt clamping bars independently pivotally mounted on the mounting bracket and being eccentrically shaped to define belt clamping faces which are movable toward and away from each other upon rotation of the belt clamping bars. The first belt clamping bar has an associated reaction arm which is traversed by the belt so that imposition of an occupant restraint load on the belt induces forced rotation of the first belt clamping bar. A linkage interconnects the first and second belt clamping bars to simultaneously force rotation of the second clamping bar in a direction toward the first belt clamping bar to thereby move the respective eccentric belt clamping faces of the first and second belt clamping bars into belt clamping proximity with each other to clamp the belt therebetween against further movement through the guide loop assembly. A spring is preferably provided to establish the belt clamping bars in their respective normal positions in which the eccentric belt clamping faces are spaced apart to permit free sliding movement of the belt through the guide loop assembly.

4 Claims, 3 Drawing Figures

BELT CLAMPING GUIDE LOOP

The invention relates to a guide loop assembly for a motor vehicle occupant restraint system and more particularly provides a clamping mechanism which clamps the belt against sliding movement through the loop assembly in response to imposition of an occupant restraint load on the belt.

BACKGROUND OF THE INVENTION

It is well known in motor vehicle seat belt systems to pivotally mount a guide loop on the pillar to deflect the belt from a seat belt retractor mounted on the floor to a diagonal position across the occupant upper torso. These seat belt retractors typically include a locking mechanism which locks the belt against unwinding from the retractor in response to the onset of a sensed vehicle deceleration condition.

It is also known in prior art to provide a clamping mechanism which is associated with the guide loop assembly and functions to clamp the belt against sliding movement through the guide loop in consequence of imposition of an occupant restraint load on the belt. Examples of such belt clamping guide loops include U.S. Pat. Nos. 3,847,434 Weman issued Nov. 12, 1974; U.S. Pat. No. 3,898,715 Balder issued Aug. 12, 1975; U.S. Pat. No. 4,009,510 Lindblad issued Mar. 1, 1977; U.S. Pat. No 4,341,359 Jahn issued July 27, 1982; U.S Pat. No. 3,886,374 Lefeuvre issued May 27, 1975; U.S. Pat. No. 3,924,875 Lefeuvre issued Dec. 9, 1975; U.S. Pat. No. 4,208,770 Takada issued June 24, 1980; U.S. Pat. No. 3,911,535 Mauron issued Oct. 14, 1975; U.S. Pat. No. 4,310,175 Pickett issued Jan. 12, 1982; U.S. Pat. No. 4,371,127 Shimogawa et al issued Feb. 1, 1983 and Furusawa et al 4,310,176 issued Jan. 12, 1982.

The present invention provides a new and improved clamping guide loop assembly.

SUMMARY OF THE INVENTION

According to the invention, a restraint belt guide loop assembly for deflecting a belt from a retractor to a diagonal position across the occupant upper torso includes a mounting bracket pivotally mounted on the vehicle body and a first and second belt clamping bars independently pivotally mounted on the mounting bracket and being eccentrically shaped to define belt clamping faces which are movable toward and away from each other upon rotation of the belt clamping bars. The first belt clamping bar has an associated reaction arm which is traversed by the belt so that imposition of an occupant restraint load on the belt induces forced rotation of the first belt clamping bar. A linkage interconnects the first and second belt clamping bars to simultaneously force rotation of the second belt clamping bar in a direction toward the first belt clamping bar to thereby move the respective eccentric belt clamping faces of the first and second belt clamping bars into belt clamping proximity with each other to clamp the belt therebetween against further movement through the guide loop assembly. A spring is preferably provided to establish the belt clamping bars in their respective normal positions in which the eccentric belt clamping faces are spaced apart to permit free sliding movement of the belt through the guide loop assembly.

DESCRIPTION OF THE DRAWINGS

These and other features, objects and advantages of the invention will become apparent upon consideration of the specification and appended drawings in which.

DESCRIPTION OF THE PREFERRED EMBODIMENT

Figure 1:
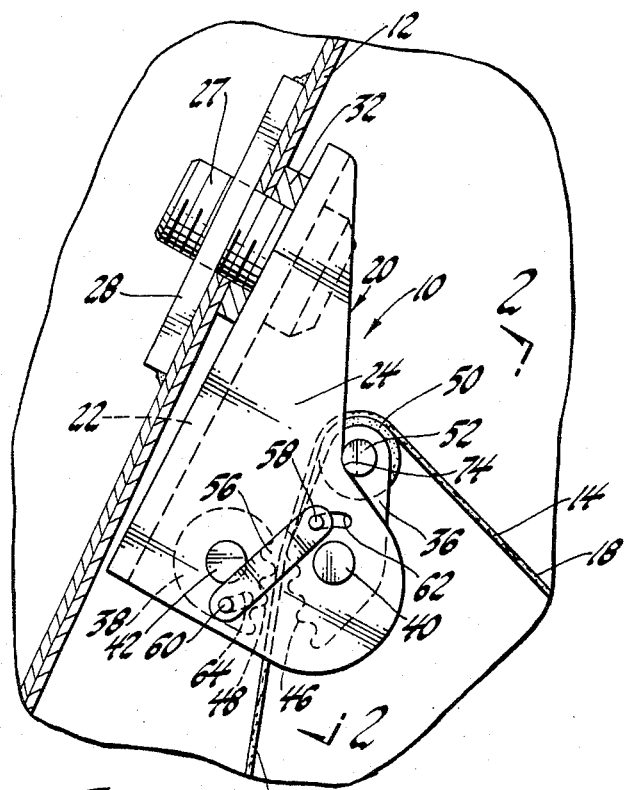
FIG. 1 is a side elevation view of the belt clamping guide loop assembly of this invention.
Figure 2:
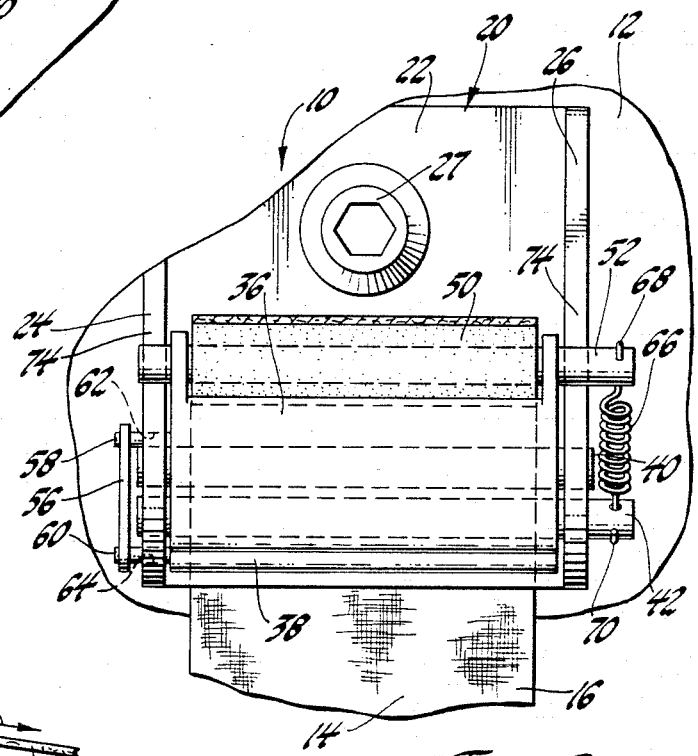
FIG. 2 is a frontal elevation view of the belt clamping guide loop assembly of this invention.

Referring to FIGS. 1 and 2 there is shown a belt clamping guide loop assembly generally indicated at 10 which is mounted on a vehicle body pillar 12 and slidably receives a restraint belt 14 having a segment 16 which extends vertically along the pillar and is wound upon the reel of a conventional inertia locking seat belt retractor and a segment 18 which is deflected diagonally across the occupant upper torso when the restraint belt is buckled about the seated occupant.

The guide loop assembly 10 includes a mounting bracket 20 which includes a base wall 22 and a pair of parallel spaced apart upstanding side walls 24 and 26. The mounting bracket 20 is pivotally mounted on the pillar 12 by an anchor bolt 27 which extends through an aperture in the base wall 22 as well as a hole in the pillar 12 and is threadedly engaged in a weld nut 28. A spacer bushing 32 is provided between the base wall 22 of the mounting bracket and the pillar 12.

A first belt clamping bar 36 and a second belt clamping bar 38 are respectively pivotally mounted on the mounting bracket 20 by pivot shafts 40 and 42. As best seen in FIG. 2, the belt clamping bars 36 and 38 are somewhat wider than the width of the restraint belt 14 but fit within the confines of the upstanding side walls 24 and 26 of the mounting bracket 20. The pivot shafts 40 and 42 extend respectively through the belt clamping bars 36 and 38 and through apertures in the upstanding side walls 24 and 26 to mount the clamping bars 36 and 38 for rotational movement.

Figure 3:
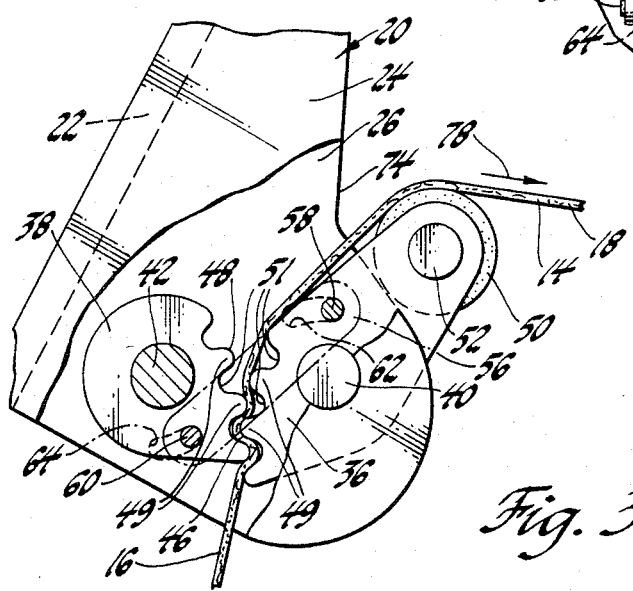
FIG. 3 is an enlarged fragmentary view corresponding to FIG. 1 having parts broken away and in section and showing the belt clamped against movement through the guide loop assembly in response to the onset of an occupant restraint load.

As best seen in FIG. 3, the clamping bars 36 and 38 are eccentrically shaped to provide a belt clamping face 46 on the belt clamping bar 36 and a belt clamping face 48 on the belt clamping bar 38. These belt clamping faces 46 and 48 preferably include teeth-like lobes 49 and valleys 51 which are spaced relative one another to interdigitate upon coordinated rotation of the belt clamping bars 36 and 38. As best seen in FIGS. 2 and 3, the restraint belt 14 passes between the belt clamping surfaces 46 and 48 of the belt clamping bars 36 and 38 and is deflected over a reaction roller 50 which is mounted upon the first belt clamping bar 36 by a roller shaft 52.

As best seen in FIGS. 1 and 2, the rotary movement of the belt clamping bars 36 and 38 is coordinated by a linkage extending therebetween. The linkage includes a link 56 which is pivotally connected to the clamping bar 36 by a pivot pin 58 and pivotally connected to the clamping bar 38 by a pivot pin 60. The pivot pin 58 extends through a curved slot 62 provided in the side wall 24 of the mounting bracket 20. The ends of the curved slot 62 define stops which limit the rotary movement of the clamping bar 36 relative to the mounting bracket 20. The pivot pin 60 is similarly arranged to extend through the curved slot 64 in the upstanding wall 24.

As best seen in FIG. 2, a coil tension spring 66 has an upper end 68 hooked over the roller shaft 52 of clamping bar 36 and its lower end 70 hooked over the pivot shaft 42 so that the spring urges rotation of the belt clamping bar 36 to the normal position of FIG. 1 in which the roller shaft 52 engages against the edge face 74 of the side walls 24 and 26 to define a normal position of the belt clamping bar 36. Simultaneously the link 56 establishes the normal position of the belt clamping bar 38. At this normal position, as shown in FIG. 1, the belt clamping faces 46 of belt clamping bar 36 and 48 of belt clamping bar 38 are spaced apart to permit the passage of the restraint belt 14 therebetween during winding and unwinding of the belt from the seat belt retractor.

When the motor vehicle experiences a rapid deceleration, the seat belt retractor is locked against belt unwinding rotation. The forward movement of the occupant relative the seat imposes an occupant restraint load on the belt 14. This occupant restraint load on the belt 14 reacts against the reaction roller 50 in the direction of arrow 78, in FIG. 3, and induces a forced pivotal rotation of the first belt clamping bar 36 against the effort of the coil tension spring 66. Concomitantly the link 56 acting between the belt clamping bars 36 and 38 will forcibly rotate the belt clamping bar 38 in the counterclockwise direction. Accordingly, because of the eccentric shape of the belt clamping bars, the belt clamping faces 46 and 48 are carried into belt clamping proximity with one another so that the belt 14 is clamped between the interdigitating lobes 49 and valleys 51 of the clamping faces. Thus the belt 14 is effectively clamped against any further sliding movement through the guide loop assembly 10. Furthermore it will be understood that the greater the occupant load imposed on the belt, the greater will be the reaction force acting on the belt clamping bar 36 and through the link 56 on the clamping bar 38 to clamp the restraint belt 14 against movement through the guide loop assembly.

When the occupant restraint load is removed from the belt 14, the coil tension spring 66 will pivot the clamping bar 36 counterclockwise to the normal position of FIG. 1 while the link 56 will simultaneously coordinate the clockwise rotation of the clamping bar 38. Thus the belt clamping guide loop assembly is automatically reset to enable free sliding movement of the restraint belt 14 through the guide loop assembly.

Thus it is seen that the invention provides a new, novel and useful belt clamping guide loop assembly for a motor vehicle seat belt system.

The embodiments of the invention in which an exclusive property or privilege is claimed are defined as follows:

1. A restraint belt guide loop assembly adapted to be mounted on a vehicle body and slidably receive the belt from a locking retractor and deflect the belt diagonally across the occupant shoulder comprising:
   a mounting bracket mounted on the vehicle body;
   first and second belt eccentric clamping bars independently pivotally mounted on the mounting bracket, and having clamping faces which are movable upon rotation of the belt clamping bars between positions allowing free passage of the belt therebetween and clamping positions in which the belt is clamped therebetween;
   said first belt clamping bar having an associated reaction arm traversed by the belt and effective to induce forced rotation of the first belt clamping bar upon imposition of occupant restraint load upon the belt; and
   means interconnecting the first and second belt clamping bars to coordinate the rotational movement thereof whereby the forced rotation of the first belt clamping bar by the occupant restraint load induces coordinated rotation of the second belt clamping bar to move the respective eccentric belt clamping faces of the first and second belt clamping bars into belt clamping proximity with each other to clamp the belt therebetween against further movement through the guide loop assembly.

2. A restaint belt guide loop assembly adapted to be mounted on a vehicle body and slidably receive the belt from a locking retractor and deflect the belt diagonally across the occupant shoulder comprising:
   a mounting bracket mounted on the vehicle body;
   a first belt clamping bar pivotally mounted on the mounting bracket and having an eccentrically shaped belt clamping face at one end thereof and a belt reaction portion at the other end traversed by the belt during winding and unwinding of belt from the retractor;
   a second belt clamping bar pivotally mounted on the mounting bracket and having an eccentrically arranged clamping face disposed on the opposite side of the belt from the first belt clamping bar; and
   a link having one end pivotally mounted to the first clamping bar and the second end pivotally connected to the second clamping bar whereby pivotal rotation of the first clamping bar in one direction of rotation induced by the onset of an occupant restraint load on the belt poses a rotary movement of the second clamping bar in the opposite direction of rotation whereby the eccentrically disposed belt clamping faces of the first and second belt clamping members are moved toward one another to forcibly clamp the belt therebetween to prevent movement of the belt through the guide loop assembly.

3. A guide loop assembly of claim 1 and further characterized by spring means acting to urge at least one of the first and second belt clamping bars to the position allowing free passage of the belt between the first and second belt clamping bars.

4. The guide loop assembly of claims 1, 2 or 3 in which the eccentric belt clamping faces of the first and second belt clamping bars have interdigitating teeth thereon for clamping the belt upon movement of the belt clamping bars to the respective belt clamping positions in response to the imposition of an occupant restraint load on the belt.

* * * * *